United States Patent [19]
van der Lely

[11] 4,252,199
[45] Feb. 24, 1981

[54] SOIL WORKING MACHINES

[76] Inventor: Cornelis van der Lely, 7, Brüschenrain, Zug, Switzerland

[21] Appl. No.: 947,118

[22] Filed: Sep. 29, 1978

[30] Foreign Application Priority Data

Sep. 29, 1977 [NL] Netherlands ................. 7710636

[51] Int. Cl.³ ............... A01B 19/16; A01B 23/02; A01B 27/00
[52] U.S. Cl. .................... 172/54; 172/56; 172/68; 172/70; 172/118; 172/552; 172/713; 172/762
[58] Field of Search ............ 172/54, 48, 50, 53, 172/56, 63, 68, 70, 71, 84, 427, 122, 552, 199, 200, 59, 713, 72, 150, 151, 175, 121, 762, 763, 118; 248/284, 286

[56] References Cited

U.S. PATENT DOCUMENTS

| | | | |
|---|---|---|---|
| 289,260 | 11/1883 | Herrmann | 172/713 X |
| 487,722 | 12/1892 | Dernell | 172/552 X |
| 853,523 | 5/1907 | Stark | 172/84 |
| 921,552 | 5/1909 | Peden | 172/552 X |
| 1,718,248 | 6/1929 | Mohr | 172/713 X |
| 1,897,550 | 2/1933 | Coleman | 172/713 X |
| 2,434,986 | 1/1948 | Bremer | 248/284 X |
| 2,505,276 | 4/1950 | Boroski | 172/552 X |
| 2,727,448 | 12/1955 | Taylor | 172/552 X |
| 2,811,912 | 11/1957 | Howard | 172/552 X |
| 2,871,959 | 2/1959 | Koskenmaki | 172/200 X |
| 3,003,737 | 10/1961 | Mehr | 248/286 |
| 3,593,952 | 7/1971 | Smith | 248/284 |
| 3,783,948 | 1/1974 | Lely et al. | 172/59 X |
| 3,884,309 | 5/1975 | Schneider | 172/427 X |
| 4,018,289 | 4/1977 | Lely et al. | 172/713 |
| 4,171,725 | 10/1979 | Saugstad et al. | 172/68 X |

FOREIGN PATENT DOCUMENTS

| | | |
|---|---|---|
| 239465 | 10/1911 | Fed. Rep. of Germany ............ 172/48 |
| 401879 | 9/1924 | Fed. Rep. of Germany ............ 172/68 |
| 420886 | 11/1925 | Fed. Rep. of Germany ............ 172/48 |

*Primary Examiner*—Paul E. Shapiro
*Attorney, Agent, or Firm*—Mason, Mason and Albright

[57] ABSTRACT

A soil working machine has elongated carriers that extend transverse to the direction of travel, one behind the other. Eccentric mechanisms are attached to each carrier to move tools depending from the carriers, back and forth in directions parallel to the direction of travel. The eccentrics have upper supports connected with resilient controls and lower supports of unequal lengths so that the tools work different paths. A front levelling member is connected to the frame via a parallelogram linkage and the rear carrier has a row of tines. A supporting roller is connected to the frame by arms each of which has two portions. The portions can be pivoted or slid towards and away from one another so that the roller is also moved towards and away from the carriers. Also, the arms with roller are vertically adjustable and fixable in position.

12 Claims, 12 Drawing Figures

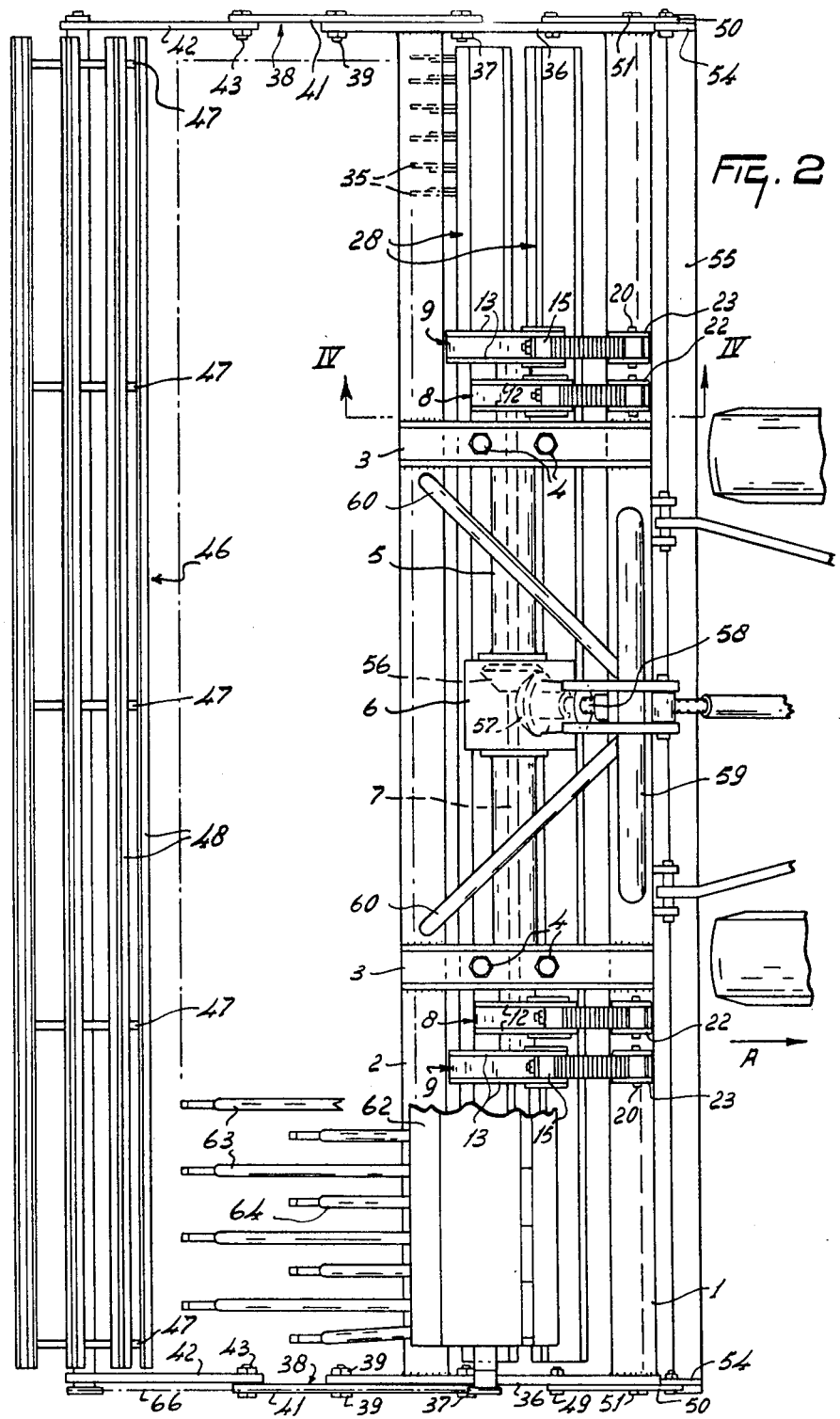

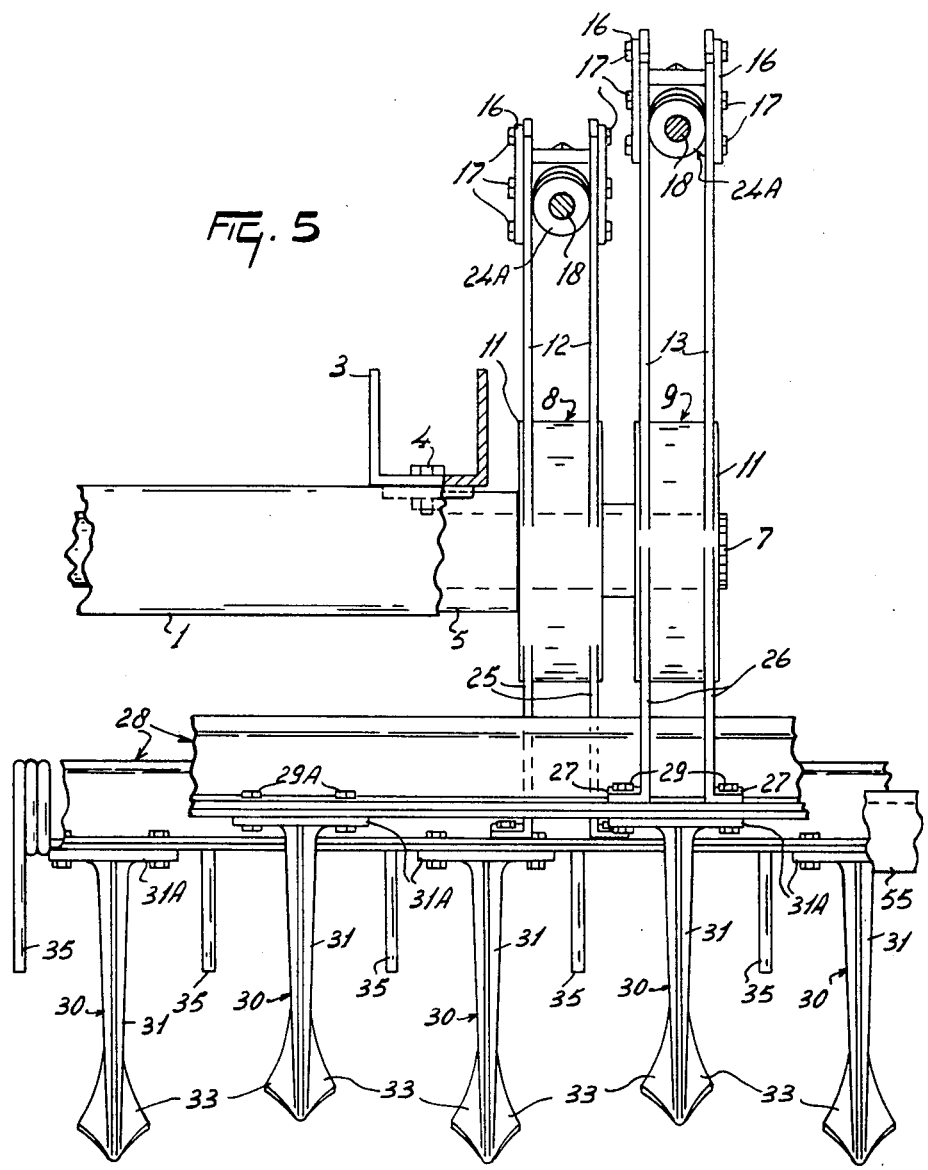

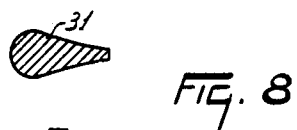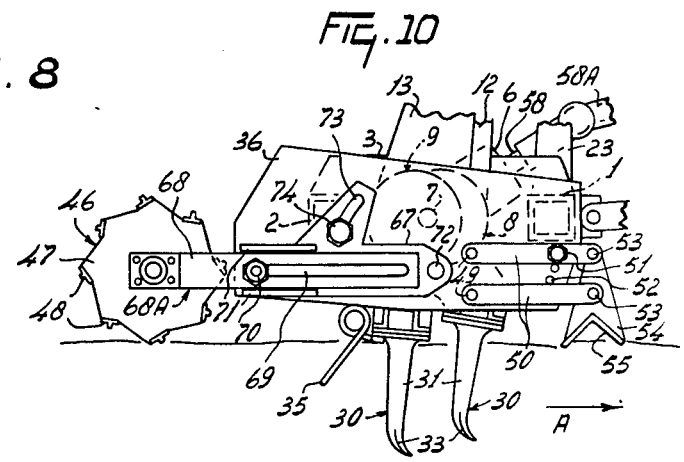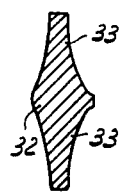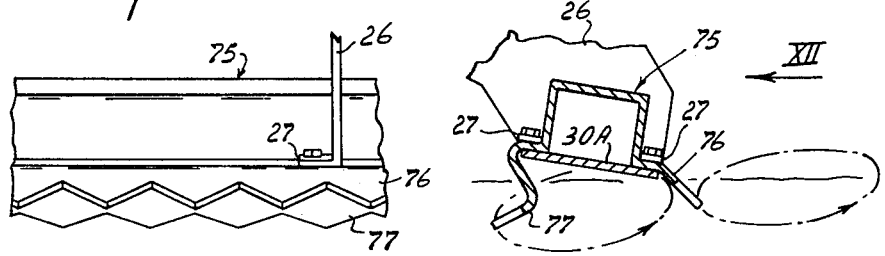

SOIL WORKING MACHINES

According to a first aspect of the present invention there is provided a soil working machine comprising a power driven soil working member and a supporting member for engaging the ground, the position of the supporting member being adjustable to vary the horizontal distance between the soil working member and the supporting member.

According to a second aspect of the present invention there is provided a soil working machine comprising a soil working member and a supporting member for engaging the ground, the supporting member being mounted on an arm which comprises two portions which are pivotable relatively to one another.

According to a third aspect of the present invention there is provided a soil working machine comprising a soil working member arranged on a carrier extending transversely of the intended direction of operative travel of the machine, the carrier being movable, in operation by an eccentric mechanism, the soil working member having a forwardly curved, flattened lower portion.

According to a fourth aspect of the present invention there is provided a soil working machine comprising a supporting member for supporting the machine on the ground, the supporting member being displaceable between two positions relative to the rest of the machine, the supporting member being at the same vertical level, relative to the rest of the machine, in each of the two positions.

The present invention also provides a soil working member for a soil working machine.

For a better understanding of the present invention and to show how it may be carried into effect, reference will now be made, by way of example only, to the accompanying drawings, in which;

FIG. 2 is a plan view of the machine of FIG. 1;

FIG. 5 is an enlarged view taken in the direction of the arrow V in FIG. 4;

FIGS. 6, 7, 8 and 9 are cross-sectional views taken on the lines VI—VI, VII—VII, VIII—VIII and IX—IX respectively in FIG. 4;

FIG. 10 shows a second embodiment for part of the machine;

FIG. 11 shows a second embodiment of another part of the machine; and

FIG. 12 is a view in the direction of the arrow XII in FIG. 11.

Figure 3:
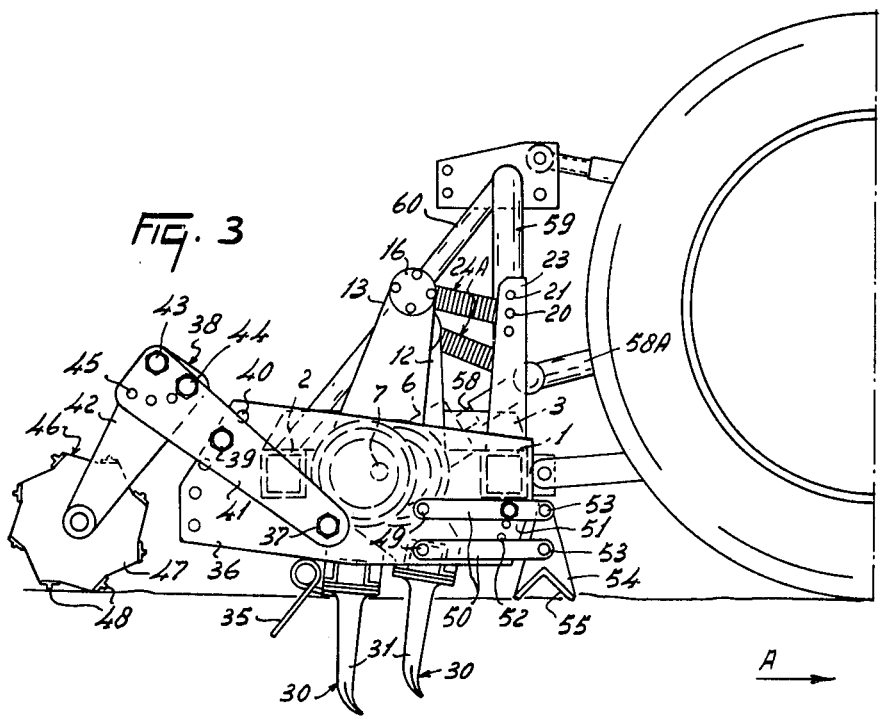
FIG. 3 is a side elevation of the machine of FIG. 1 without a seed drill.
Figure 4:
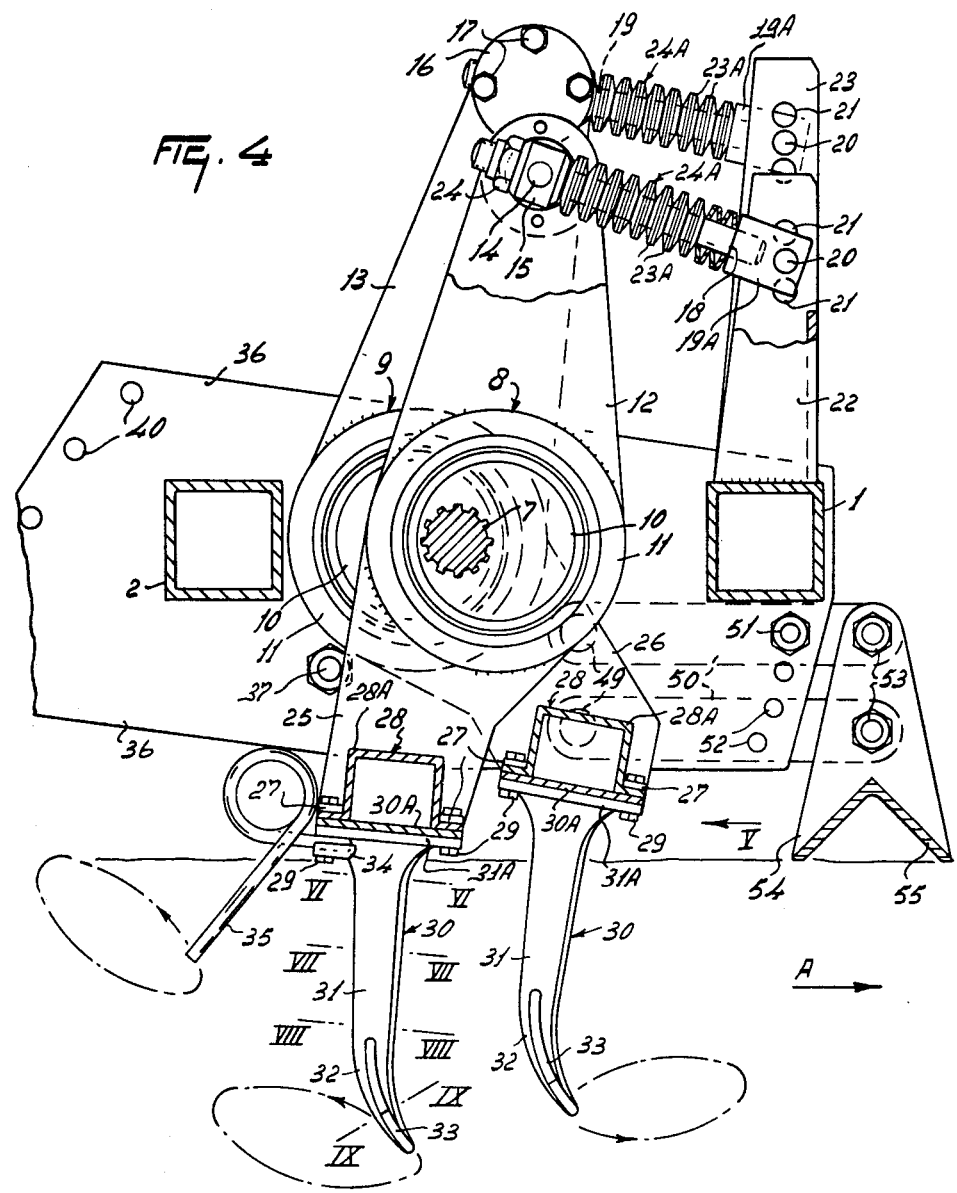
FIG. 4 is an enlarged view taken on the line IV—IV in FIG. 2.

The construction illustrated in the Figures is a soil working machine comprising a frame having two frame beams 1 and 2 extending transversely of the intended direction of operative travel of the machine, indicated by an arrow A. The frame beams 1 and 2 are located one behind the other and are substantially parallel to one another. At equal distances from the center on each side of the frame beams 1 and 2 are interconnected by tie beams 3 which extend in the direction A and comprise channel-section members. The tie beams 3 are arranged so that the limbs of the channel sections extend upwardly. A tube 5 is connected by bolts 4 to the lower side of each beam 3, near its center. Each tube 5 extends tranvsersely of the direction A and is parallel to the frame beams 1 and 2. The tubes are interconnected in the middle by a gear box 6. In the tubes 5 is journalled a shaft 7, the two ends of which emerge from the tube. Each end of the shaft 7 is provided with a pair of eccentric mechanisms 8 and 9. These mechanisms have eccentric discs 10 and the discs of each pair are arranged on the shaft 7 with a phase difference of 180° to one another (FIGS. 2 to 4). Each eccentric disc 10 carries a ring 11 on a ball bearing. In the position shown in FIG. 4 for the eccentric discs 10, the eccentric mechanism 8 of each pair is located mainly in front of the shaft 7, with respect to the direction A, and the eccentric mechanism 9 of each of pair is located mainly behind the shaft 7. The ring of each eccentric mechanism 8 and 9 is provided on the top with two spaced supports 12 and 13 respectively, which taper upwardly away from the rings and are inclined forwardly. The supports 13, fastened to the rings 11 of the outboard eccentric mechanism 9 of each pair, extend upwards further than the supports 12, fastened to the rings 11 of the inboard eccentric mechanisms 8. Between the pair of supports 12 and 13 of each ring there is a block 15 which is pivotally connected to the supports by a stub shaft 14 near the top of the supports. The sub shafts 14 are each supported in bearings 16 secured in an opening in each support by bolts 17. Through a bore in each block 15 passes a rod 18 or 19 respectively. The front end of each rod 18 or 19 is fitted in a block 19A. The block 19A is fixed in place by a pin 20, which passes through one of a plurality of holes 21 in the limbs of a U-shaped support 22 or 23 respectively, secured to the foremost frame beam 1. Between each block 19A and the corresponding block 15 the rods 18 and 19 extend through a stack of cup springs 23A. Each rod 18 or 19 is held in place with respect to the block 15 by a nut 24 which co-operates with screwthread at the end of the rod. The rods 18 and 19, with the surrounding cup springs 24, constitute resilient control means 24A for the eccentric mechanisms 8 and 9. Each ring 11 of the mechanisms 8 and 9 is provided at its lower region with spaced supports 25 and 26 respectively. The supports 25 on the rings 11 of the eccentric mechanisms 8 are slightly inclined downwardly and rearwardly, whereas the supports 26 fastened to the rings 11 of the eccentric mechanisms 9 slope forwardly at a larger angle (FIG. 4). The ends of the supports 25 fastened to the rings 11 of the eccentric mechanisms 8 are located at a lower level than the ends of the supports 26 secured to the rings 11 of the eccentric mechanisms 9. Each support 25 or 26 is provided at its lower end with a recess having flanges 27 extending perpendicular to the support at the front and rear. The supports 25 and 26 are provided with sheet metal carriers 28 which extend tranversely of the direction A and each have a channel-section profile 28A fitting in the recesses of one of the supports 25 and 26. The limbs of the carriers 28 extend downwardly. These limbs have, outside the recesses, outwardly directed flanges which are clamped by bolts 29 to the flanges 27 of the supports 25 and 26. The open side of each carrier 28 is covered by a plate 30A, which is fastened by bolts 29 and by bolts 29A with the flanges on the limbs of the carrier 28. At equal intervals along the carriers 28 are disposed rigid soil cultivating members 30. Each member 30 has at the top a rectangular, (in this embodiment square) fastening portion 31A, which is substantially perpendicular to the longitudinal centreline of the member and is secured to the bottom of the carrier 28 by the bolts 29 and 29A used for fastening the plate 30. Each member 30 has a downwardly extending portion 31, which terminates in a lower portion 39 which curves forwardly. Each member has a generally oval cross-section, the major axis of which extends in the direction A. The cross-sectional area gradually decreases in a downward direction, the free end of the member being pointed (see FIGS. 4 to 8). The front of the member has a rib providing a kind of cutting edge extending up to the free end. From the transition of the portion 31 into the curved portion 32, the member is flattened, being provided on its broader sides with V-shaped flukes 33 which give the member a spoon-like shape. From the transition into the portion 32 the flukes extend outwardly from the rest of the member, with a slightly concave edge, which meets at a sharp bend with a further slightly concave edge extending inwardly to the point of the member. The first-mentioned edges have a length about twice the length of the further edges. The flukes 33 give to the curved part 32 generally the shape of a spoon (FIGS. 5 and 9). At the level of each member 30 the rearmost carrier 28 is provided, on the rear, with a tine 35 having a fastening portion which is fastened to the carrier 28 by clamping pieces 34 and the bolts 29 and 29A. The tine 35 has a plurality of coils joining the fastening portion and merging into a straight, rearwardly inclined operative portion. The length of this tine is about half the length of each member 30. The coils are arranged so that they trail the top end of the downwardly inclined operative portion.

The ends of the beams 1 and 2 are interconnected by upwardly extending plates 36, which extend beyond the rear of the hindmost beam 2. Just in front of the hindmost beam 2 and some distance below it each plate 36 is provided with a bolt 37, about which is pivotable an arm 38 which extends rearwardly along the plate 36. The arm 38 can be set in any one of a plurality of positions by means of a bolt 39 and a plurality of holes 40 in the rear part of the plate 36. The arm 38 comprises two portions 41 and 42 of approximately the same length, their width being largest at their adjacent ends. These adjacent ends are pivotally interconnected by a bolt 43 and can be set in any one of a plurality of positions relative to one another by a bolt 44 and holes 45 in the front part 41. Between the rear ends of the portions 42 of the arms 38 there is a supporting member 46 comprising a freely rotatable roller. The supporting member 46 has a plurality of equispaced support plates 47 having circumferential serrations which provide supporting faces for a plurality of T-shaped rods 48. The portions of the serrations between the supporting faces for the rods 48 have a length about 1.5 times the length of the supporting faces. In total, there are eight rods 48. The upright limb of each rod 48, which is inclined to a radial line passing through it, has a length such that its free end is located on the arc of a circle traced by the radially outermost points of the support plate 47, each of these points being located between two consecutive serrations and lying near the end of the cross bar of one of the rods 48.

Each plate 36 is provided with bolts 49, disposed one above the other, to which are connected supporting arms 50 which extend forwardly along the plate. The top arm 50 can be moved into and fixed in any one of a plurality of positions by means of a bolt 51, which can be inserted into any one of a plurality of holes 52 in the front part of the plate 36. The front ends of the arms 50 are fastened by bolts 53 to supports 54 which extends downwardly and are fastened to a levelling member constituted by an angle iron 55. The angle iron 55 is disposed so that its limbs are directed downwards, the iron thus bearing on the ground at two spaced positions (FIGS. 2 and 14). The arms 59 provide an upwardly adjustable, pivotable parallelogram linkage for supporting the levelling member 55. As stated above, the tubes 5 are interconnected by a gearbox 6. In the gearbox 6, the shaft 7 is connected by a bevel pinion transmission 56, 57 with a shaft 58 extending in the direction A and projecting from the front side of the gear box for connection, via an auxiliary shaft 58, with the power take-off shaft of a tractor. Near the center the leading frame beam 1 is provided with a trestle 59 for coupling the machine with the three-point lift of the tractor. The top of the trestle 59 is fastened to the trailing frame beam 2 by struts 60, which are inclined downwardly and outwardly from the trestle. Near the top, the struts 60 are provided with a channel-section beam 61, on which is arranged a hopper 62 of a device for applying material onto or into the ground which, in this embodiment, is a seed drill. This hopper covers the whole width of the machine. Instead of a seed drill as shown, a fertilizer distributor or spraying equipment may be provided. The hopper 62 has outlet ports at the bottom, which communicate with downwardly inclined seed pipes 63 and 64, disposed in two banks. The hopper 62 of the seed drill has a dosing member with a stud shaft projecting from one side of the hopper and carrying a chain sprocket 65, which is linked by a chain 66 to a chain sprocket on one side of the roller 46.

The machine described above operates as follows.

Figure 1:
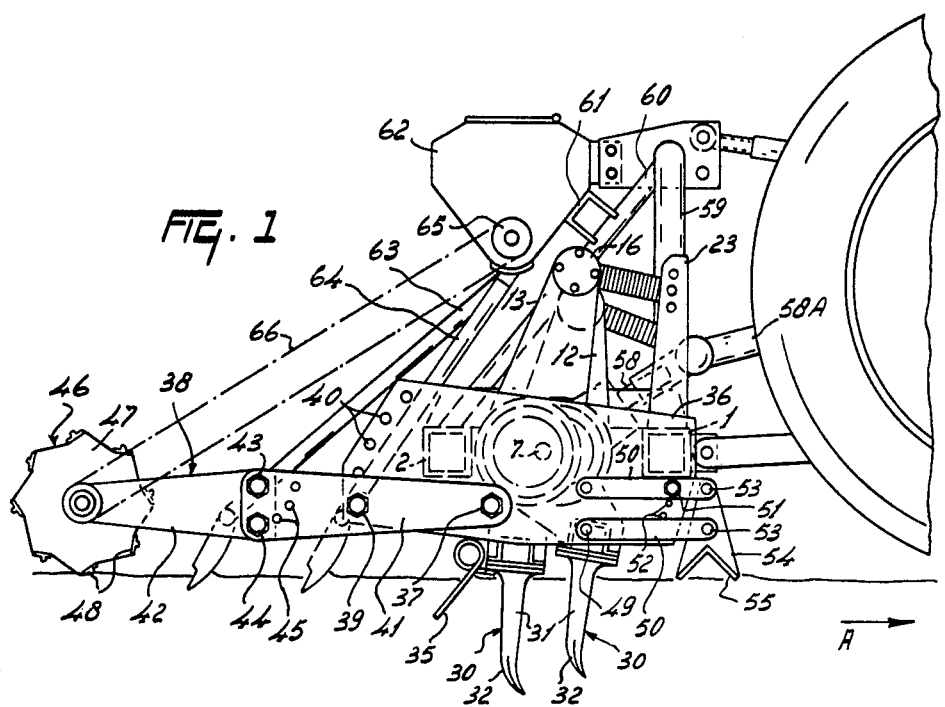
FIG. 1 is a side elevation of a soil cultivating machine in combination with a seed drill.

During operation, the machine is hitched by the trestle 59 to the three-point lifting device of a tractor and the shaft 7 can be driven, through the pinion transmission 56, 57 and the auxiliary shaft 58A, by the power take-off shaft of the tractor. During rotation of the shaft 7, the carriers 28 with the soil working members 30 are moved as indicated in FIG. 4 by means of the eccentric mechanisms 8 and 9. The ends of members 30 describe elliptical paths with the major axes extending roughly in the direction A as illustrated in the Figure, so that when the members on the leading carrier move forwards, the members on the trailing carrier move rearwardly. During these opposite movements of the members 30 on the respective carriers 28, the soil is intensively crumbled up. The movement imposed by the eccentric mechanisms 8 and 9 on the members 30 has some resilience owing to the resilient structure of the control means 24A above the eccentric mechanisms 8 and 9. This control means can be moved into and fixed in any one of a plurality of positions relative to the frame, so that the movements performed by the members 30 across the soil during operation can be modified. Since the supports 13 are longer than the supports 12, the path described by the members 30 on the leading carrier differs from the path described by the members 30 of the trailing carrier. The members 30 of the trailing carrier go deeper than those of the leading carrier. The tension of the cup springs 23 forming part of the control means 24A can be adjusted by means of the nuts 24. The resilient, short tines 35 on the rear of the trailing carrier 28 can intensify the crumbling effect on the upper layer of the soil before the supporting member 46 formed by the roller acts upon the soil. The supporting member 46, by means of which the working depth of the respective soil working members and tines can be adjusted, may be moved nearer to or further from the machine frame with the aid of the two-part arm 38. Since there is a pivotal axis formed by the bolt 43 between the supporting member and the fastening point formed by the pivotal bolt 37, the supported member can be adjusted to vary the horizontal distance between the supporting member and the soil working members on the carriers 28 (FIGS. 1 and 3). In this way, without altering the vertical setting, the supporting member 46 can be nearer to or further away from the soil working members on the carriers 28. The supporting member 46 needs to be set further from the soil working members when the machine is combined with, for example, a device for applying material onto or into the ground, such as the seed drill illustrated in FIGS. 1 and 2.

A second embodiment of adjusting means for altering the distance between the supporting member 46 and the soil working members is shown in FIG. 10. In this embodiment two portions 67 and 68 of an arm 68A have a connection between them, which comprises a slot 69 and a bolt 70, the portion 67 being provided with a guide 71 at the top and bottom. The portion 67 is pivotable about a bolt 72 and fixable in position by means of a slot 73 and a bolt 74 to adjust the supporting member 46 vertically. The elongate elements of the roller 46 formed by T-shaped rods have an intensive crumbling and consolidating effect. By means of the levelling member 55 supported at the front by the parallelogram linkage, the strip of soil to be worked on rough fields can be flattened initially in a simple manner. By means of the parallelogram linkage the working depth of the levelling member can be adjusted, while the position of the member remains practically the same. FIG. 11 shows an embodiment of a carrier 75, which may be used instead of the carriers 28. This replacement can be quickly performed by loosening the bolts 29 fastening the flanges of the supports 25 and 26 to the carriers 28. After removal of the carrier 28 from the recesses of the supports the carrier 75 can be fitted. In the carrier 75, the limbs of the channel-section 28A are provided with extensions 76 and 77. The part 76 is inclined downwardly and outwardly, whereas the part 77 initially slopes downwards and inwards and then extends through a right-angle bend in a downwardly and outwardly inclined direction. The parts 76 and 77, which cover the whole length of the carrier and are provided with serrations, are capable of intensively crumbling the upper layer of the strip of soil to be treated. FIG. 11 illustrates the carrier 75 in a position such that the part 76 is located at the front. However, the carrier may, as an alternative, be disposed so that the part 77 is located at the front. One carrier 75 with the parts 76 and 77 may be employed in conjunction with a carrier 28.

While various features of the soil working machine that have been described, and that are illustrated in the drawings, will be set forth in the following claims as inventive features, it is to be noted that the invention is not necessarily limited to those features and that it encompasses all of the features that have been described both individually and in various combinations.

What we claim is:

1. A soil working machine comprising a frame and at least one soil working member pivoted to said frame, eccentric driving means connected to said soil working member to move same back and forth in directions generally parallel to the direction of machine travel, said member comprising an elongated carrier that extends transverse to the direction of travel and a plurality of tools mounted along the length of said carrier, each of said tools having a forwardly curved flattened lower portion that is moved through the soil and said carrier being connected to an eccentric mechanism of said driving means, a row of resilient tines being mounted on said carrier at the rear of the said tools.

2. A soil working machine as claimed in claim 1, in which a supporting member is arranged behind said carrier and connected to the frame.

3. A soil working machine as claimed in claim 2, in which said tool has a generally oval cross-section which narrows from top to bottom to a point, the major axis of the oval cross-section extending in the direction of travel.

4. A soil working machine as claimed in claim 2, in which said carrier comprises two sheet portions clamped to one another and at least one of the sheet portions is nonplanar, said tool being fastened to the carrier by clamping means which also clamps the two sheet portions together.

5. A soil working machine as claimed in claim 4, in which said tool has a fastening portion at the top thereof.

6. A soil working machine as claimed in claim 5, in which said fastening portion is flat and has a rectangular configuration.

7. A soil working machine as claimed in claim 6, in which said fastening portion is substantially perpendicular to the length of the tool.

8. A soil working machine comprising a frame and two soil working members pivoted on said frame, one behind the other, eccentric driving means connected to said soil working members to move same back and forth in directions generally parallel to the direction of machine travel, each member comprising an elongated carrier that extends transverse to the direction of travel and a plurality of tools mounted along the length of said carrier, said tools having lower portions that are moved through the soil and said carrier being connected to an eccentric mechanism of said driving means, said mechanism including a pair of spaced apart eccentrics connected to a common driving shaft and the eccentrics of one carrier being arranged with a phase difference of about 180° relative to the pair of eccentrics of the other carrier, whereby the tools of one carrier are moved in a forward direction when the tools of the other carrier are moved in a rearward direction.

9. A soil working machine as claimed in claim 8, in which the eccentrics of each pair are pivotally connected through control means to spaced apart supports of unequal lengths, the paths described by the tools of the two carriers being different.

10. A soil working machine as claimed in claim 9, in which said control means comprises a respective rod extending through a plurality of cup springs and the tensions of said springs are adjustable.

11. A soil working machine as claimed in claim 8, wherein a supporting roller is connected to the frame and positioned to the rear of said carrier, said roller being pivotably interconnected to the frame by arms and said arms each comprising two portions that can be moved relative to one another, means fixing said portions in any one of a plurality of adjusted positions.

12. A soil working machine as claimed in claim 11, in which said arms are pivotably connected to the frame and setting means interconnects said arms to the frame at different soil working levels.

* * * * *